US007654807B2

(12) United States Patent
Gannaway et al.

(10) Patent No.: US 7,654,807 B2
(45) Date of Patent: Feb. 2, 2010

(54) METHOD AND SYSTEM FOR GENERATING FOAM FOR THE MANUFACTURE OF GYPSUM PRODUCTS

(75) Inventors: Kerry G. Gannaway, Albuquerque, NM (US); Raymond J. Barnes, Albuquerque, NM (US); Floyd E. Sims, Rio Rancho, NM (US)

(73) Assignee: Eagle Materials Inc., Dallas, TX (US)

( * ) Notice: Subject to any disclaimer, the term of this patent is extended or adjusted under 35 U.S.C. 154(b) by 16 days.

(21) Appl. No.: 12/173,887

(22) Filed: Jul. 16, 2008

(65) Prior Publication Data

US 2008/0274226 A1 Nov. 6, 2008

Related U.S. Application Data

(63) Continuation of application No. 10/838,901, filed on May 4, 2004, now Pat. No. 7,404,917.

(51) Int. Cl.
*B29C 44/36* (2006.01)

(52) U.S. Cl. ......................... 425/4 C; 156/39; 156/346; 366/101

(58) Field of Classification Search ....................... None
See application file for complete search history.

(56) References Cited

U.S. PATENT DOCUMENTS

| | | | | |
|---|---|---|---|---|
| 2,864,714 | A | 12/1958 | Dixon, Jr. et al. | |
| 4,161,855 | A | 7/1979 | Mulvey et al. | 52/612 |
| 4,240,839 | A | 12/1980 | Crepeau et al. | 106/88 |
| 4,310,996 | A | 1/1982 | Mulvey et al. | 52/809 |
| 4,455,271 | A | 6/1984 | Johnson | 264/42 |
| 4,872,913 | A | 10/1989 | Dunton et al. | 106/88 |
| 5,356,565 | A | 10/1994 | Southwell | 252/307 |
| 5,683,635 | A | 11/1997 | Sucech et al. | 264/42 |
| 6,422,734 | B1 | 7/2002 | Sethuraman et al. | 366/101 |

*Primary Examiner*—Mary Lynn F Theisen
(74) *Attorney, Agent, or Firm*—Baker Botts L.L.P.

(57) ABSTRACT

A method for generating foam for gypsum product manufacturing includes injecting water through a conduit and injecting a foaming agent through the conduit to form a first solution comprising the water and the foaming agent. The method includes straining the first solution in the conduit and injecting air through the conduit to form a second solution comprising the water, the foaming agent and the air. The method also includes straining the second solution in the conduit to form foam and communicating the foam to a gypsum product manufacturing device.

15 Claims, 3 Drawing Sheets

METHOD AND SYSTEM FOR GENERATING FOAM FOR THE MANUFACTURE OF GYPSUM PRODUCTS

CROSS-REFERENCE TO RELATED APPLICATION

This application is a continuation of U.S. application Ser. No. 10/838,901, filed May 4, 2004 and entitled "Method and System for Generating Foam for the Manufacture of Gypsum Products", which is hereby incorporated by reference.

TECHNICAL FIELD OF THE INVENTION

The present invention relates generally to gypsum product manufacturing and, more particularly, to a method and system for generating foam for the manufacture of gypsum products.

BACKGROUND OF THE INVENTION

Gypsum is used to manufacture various products such as drywall utilized in building construction. In the manufacture of many gypsum products, foam is introduced into a gypsum solution or mixture. The bubbles generated by the foam help to reduce the weight of the product so that shipping and handling of the product is easier and less costly. In the manufacturing process, the foam may be significantly agitated during foam generation which may lead to a breakdown of the foam.

SUMMARY OF THE INVENTION

The present invention provides a method and system for generating foam for the manufacture of gypsum products that substantially eliminates or reduces at least some of the disadvantages and problems associated with previous gypsum product manufacturing methods and systems.

In accordance with a particular embodiment of the present invention, a method for generating foam for gypsum product manufacturing includes injecting water through a conduit and injecting a foaming agent through the conduit to form a first solution comprising the water and the foaming agent. The method includes straining the first solution in the conduit and injecting air through the conduit to form a second solution comprising the water, the foaming agent and the air. The method also includes straining the second solution in the conduit to form foam and communicating the foam to a gypsum product manufacturing device.

The method may also include blending the water and the foaming agent at a blending tube in the conduit and injecting air through the conduit into the first solution upstream of the straining of the first solution in the conduit. The conduit may comprise a pipe having a diameter of approximately 1.5 inches. Injecting a foaming agent through the conduit may comprise injecting a foaming agent through a pipe having a diameter of approximately 0.5 inch. Injecting air through the conduit may comprise injecting air through a pipe having a diameter of approximately 0.75 inch. The gypsum product manufacturing device may comprise a mixing chamber or a cannister conveying a gypsum mixture from a mixing chamber. Straining the first solution may comprise straining the first solution with a 1.5 inch in-line number 60 mesh strainer, and straining the second solution may comprise straining the second solution with a 1.5 inch number 72 mesh basket strainer.

In accordance with another embodiment, a method for generating foam for gypsum product manufacturing includes injecting foam constituents through a mesh strainer into a gypsum product manufacturing device. The foam constituents comprise water, air and a foaming agent. Foam is generated as the foam constituents pass through openings of the mesh strainer. The method also includes combining the generated foam with gypsum for manufacturing gypsum products.

Injecting foam constituents through a mesh strainer into a gypsum product manufacturing device may comprise injecting water through a first conduit into a cavity of the gypsum product manufacturing device, injecting air through a second conduit into the cavity and injecting a foaming agent through a third conduit into the cavity. The cavity may be separated from an outer mixing region of a mixing chamber by the mesh strainer such that the foam is generated as the water, air and foaming agent pass through the openings of the mesh strainer into the outer mixing region of the mixing chamber.

The gypsum board manufacturing device may comprise a cannister conveying a gypsum mixture from a mixing chamber. In such case, injecting foam constituents through a mesh strainer into a gypsum product manufacturing device may comprise injecting the foam constituents through a mesh strainer into a top of the cannister or injecting the foam constituents through a mesh strainer into a side of the cannister. In particular embodiments, injecting foam constituents through a mesh strainer into a gypsum product manufacturing device may comprise injecting water through a first conduit into a cavity in a side of the cannister, injecting air through a second conduit into the cavity and injecting a foaming agent through a third conduit into the cavity. The cavity may be separated from an internal chamber of the cannister by the mesh strainer such that the foam is generated as the water, air and foaming agent pass through the openings of the mesh strainer into the internal chamber.

Technical advantages of particular embodiments of the present invention include a method for generating foam for gypsum product manufacturing that utilizes mesh strainers which reduce the need for agitation provided by a mixing device or otherwise in the manufacturing process.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
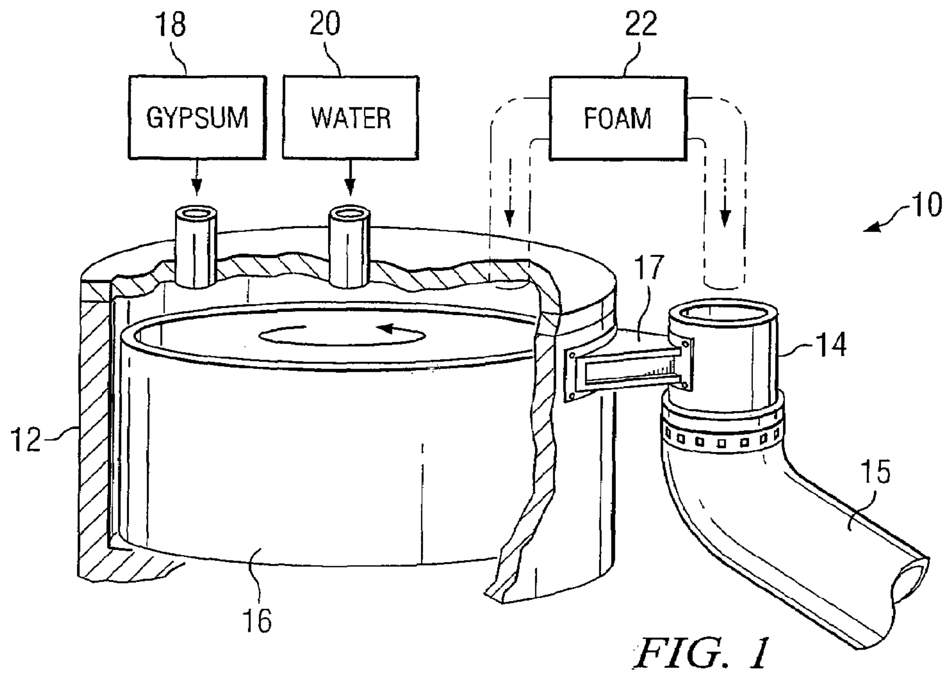
FIG. 1 illustrates a gypsum product manufacturing system, in accordance with a particular embodiment of the present invention.

FIG. 1 illustrates a gypsum product manufacturing system 10, in accordance with a particular embodiment of the present invention. Gypsum product manufacturing system 10 is used in the manufacture of gypsum products such as gypsum wall board. Gypsum product manufacturing system 10 includes a mixing chamber 12 and a cannister 14 coupled to mixing chamber 12 by a gate 17. Mixing chamber 12 includes a lump ring 16 which helps to agitate and mix ingredients of a gypsum slurry within mixing chamber 12. Lump ring 16 also helps to prevent larger conglomerations of the gypsum slurry from exiting mixing chamber 12, only allowing a relatively evenly distributed slurry to discharge into gate 17. Gypsum 18 and water 20 are introduced into mixing chamber 12 where they are mixed to form the gypsum slurry that will later be dried to form gypsum products. In operation, internal components of mixing chamber 12 rotate to agitate the gypsum 18 and water 20 to form the gypsum slurry. The gypsum slurry exits mixing chamber 12, through gate 17, into cannister 14 and boot 15, which carries the slurry to other devices for the completion of the gypsum product manufacturing process.

Mixing chambers of various sizes and configurations may be used, within the teachings of the present invention. For example, a mixing chamber having an overall diameter of approximately fifty-two inches, and an overall depth of approximately eight inches, may be used in particular embodiments of the present invention.

Other solutions and/or ingredients may be introduced into mixing chamber 12 in the formation of the gypsum slurry. In particular embodiments, foam 22 may be introduced into gypsum product manufacturing system 10. The introduction of foam enables the gypsum product to have a lighter weight for easier handling and transportation. Such lighter weight is a result of the porosity of foam 22 introduced into the gypsum slurry. Foam 22 may comprise a mixture of a foaming agent (such as a soap mixture), water and air. Foam 22 may be introduced to gypsum product manufacturing system 10 using any of a variety of methods. For example, in particular embodiments, foam 22 may be introduced into the top or side of mixing chamber 12. In some embodiments, foam 22 may be introduced into a top or side of gate 17, cannister 14, and/or boot 15.

In particular embodiments, the constituents of foam 22, such as the foaming agent, water, and air, may be independently introduced proximate mixing chamber 12, gate 17, cannister 14 and/or boot 15. The formation of foam 22 may be accomplished by agitating such constituents. However, in particular embodiments foam for introduction into a gypsum product manufacturing system may be formed statically, or without substantial agitation (e.g., without powered electrical independent mixing of foam constituents). Such static formation may be accomplished by communicating one or more of the foam constituents through one or more mesh strainers. Openings in the mesh strainers help to form air bubbles in the solution passing through the strainers.

Figure 2:
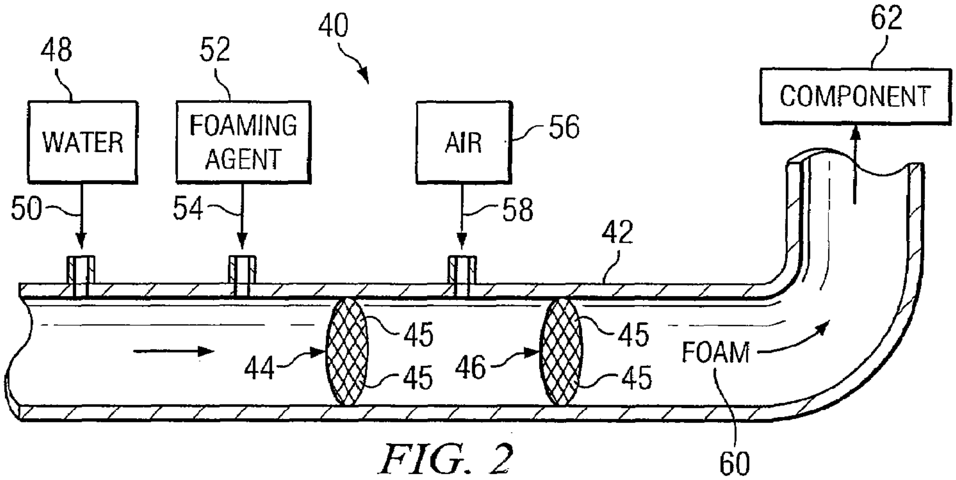
FIG. 2 illustrates a system for generating foam for gypsum product manufacturing using strainers, in accordance with a particular embodiment of the present invention.

FIG. 2 illustrates a system 40 for generating foam for gypsum product manufacturing using strainers, in accordance with an embodiment of the present invention. System 40 includes a conduit 42 for communication of the foam to a gypsum product manufacturing component. In particular embodiments, conduit 42 may comprise a pipe(s) having a diameter of approximately 1.5 inches. Conduit 42 includes mesh strainers 44 and 46 that aid in the generation of the foam in conduit 42. Mesh strainers 44 and 46 are coupled with the inside wall of conduit 42 such that flow of any foam constituent solution around mesh strainers 44 and 46 within conduit 42 is minimized. The illustrated embodiment utilizes two mesh strainers; however, other embodiments may utilize one, or more than two mesh strainers. Mesh strainers 44 and 46 include openings 45 so that foam constituents may pass through the strainers. The surface of the mesh and the flow of fluid through the mesh cooperate to induce the formation of air bubbles for the foam. Openings 45 of mesh strainers 44 and 46 may have any of a number of sizes and spacings within the scope of the present invention. Any of a number of types of mesh strainers may be used as mesh strainers 44 and 46. In particular embodiments, mesh strainer 44 may comprise a 1.5 inch in-line number 60 mesh strainer, and mesh strainer 46 may comprise a 1.5 inch number 72 mesh basket strainer.

In operation, water 48 and a foaming agent 52 are injected into conduit 42. Water 48 is injected into conduit 42 via conduit 50, which may comprise a pipe having a diameter of approximately 1.5 inches. Foaming agent 52 is introduced into conduit 42 via a conduit 54, which may comprise a pipe having a diameter of approximately 0.5 inch in particular embodiments. The water 48 and foaming agent 52 solution passes through mesh strainer 44. Openings 45 of mesh strainer 44 induce the mixing of water 48 and foaming agent 73 due, at least in part, to the turbulence created in the fluid flow. In this embodiment, air 56 is injected into conduit 42 at a location downstream of mesh strainer 44, or after mesh strainer 44 in the general direction of flow through the conduit. Some embodiments may include injecting air into a conduit at a location upstream of mesh strainer 44, or prior to mesh strainer 44 in the general direction of flow. Air 56 is injected into conduit 42 via a conduit 58, which may comprise a pipe having a diameter of approximately 0.75 inch in particular embodiments. The water 48, foaming agent 52 and air 56 solution passes through mesh strainer 46 which forms air bubbles in the resultant foam 60. Foam 60 is thus generated statically, without significant agitation of the foam constituents in the generation of the foam. Foam 60 continues through conduit 42 and is introduced into a gypsum product manufacturing system at a component 62. In particular embodiments, component 62 may comprise a mixing chamber, gate, cannister and/or boot of a gypsum product manufacturing system.

While in the illustrated embodiment water 48 and foaming agent 52 are injected into conduit 42 prior to the first mesh strainer 44, and air 56 is injected into conduit 42 between mesh strainers 44 and 46, it should be understood that in other embodiments foaming constituents (water 48, foaming agent 52 and air 56) may be injected in any suitable location with respect to each other and with respect to mesh strainers positioned within the conduit communicating the foam constituents. For example, in particular embodiments all foam constituents may be injected prior to passing through any mesh strainer.

Figure 3:
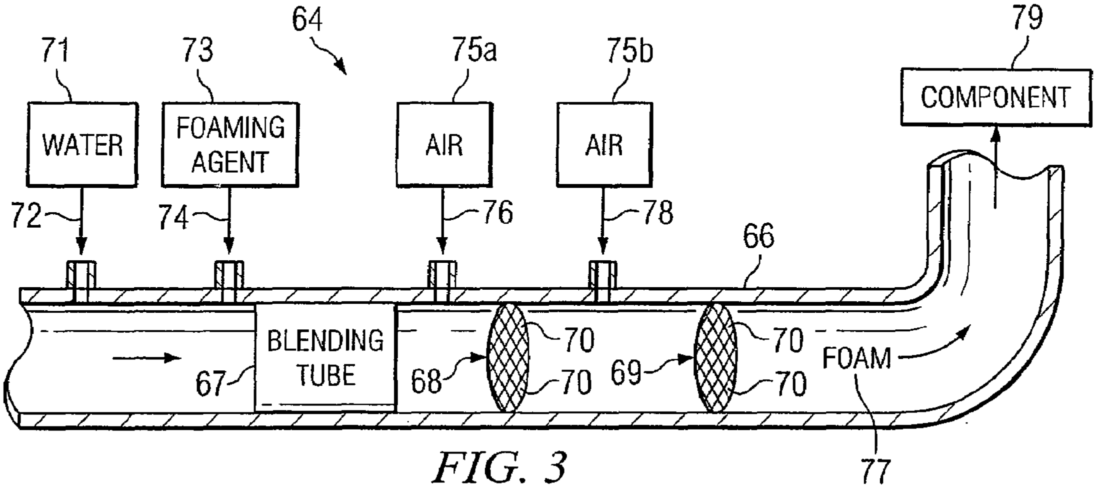
FIG. 3 illustrates a system for generating foam for gypsum product manufacturing using strainers and a blending tube, in accordance with an embodiment of the present invention.

FIG. 3 illustrates a system 64 for generating foam for gypsum product manufacturing using strainers, in accordance with another embodiment of the present invention. System 64 includes a conduit 66 for generating the foam for communication to a gypsum product manufacturing component 79. Conduit 66 includes a blending tube 67 for blending constituents flowing through the blending tube. While in the illustrated embodiment one blending tube 67 is utilized, it should be understood that other embodiments may include no blending tubes, or more than one blending tube in the conduit. Conduit 66 also includes mesh strainers 68 and 69 that aid in the generation of the foam in conduit 66. Mesh strainers 68 and 69 include openings 70 to induce air bubble formation when foam constituents pass through the strainers. In the illustrated embodiment, mesh strainer 68 comprises a 1.5 inch in-line number 60 mesh strainer, and mesh strainer 69 comprises a 1.5 inch number 72 mesh basket strainer.

In operation, water 71 and a foaming agent 73 are injected into conduit 66. Water 71 is injected into conduit 66 via conduit 72 which may comprise a pipe having a diameter of approximately 1.5 inches. Foaming agent 73 may be introduced into conduit 66 via a conduit 74 which may comprise a pipe having a diameter of approximately 0.6 inch. The water 71 and foaming agent 73 solution passes through blending tube 67 which blends the water and foaming agent. Air **75*a* is injected into conduit 66 via a conduit 76 downstream of blending tube 67. Conduit 76 may comprise a pipe having a diameter of approximately 0.75 inch. The water, foaming agent and air solution passes through mesh strainer 68 where openings 70 form air bubbles in the solution. Additional air 75*b* is injected into conduit 66 via conduit 78 downstream of mesh strainer 68. Conduit 78, like conduit 76, may comprise a pipe having a diameter of approximately 0.75 inch. The solution then passes through mesh strainer 69 which forms further air bubbles in the solution thereby generating foam 77. Foam 77 is thus generated statically (e.g., without powered electrical independent mixing of foam constituents), without significant agitation of the foam constituents in the generation of the foam. Foam 77 continues through conduit 66 and is introduced into a gypsum product manufacturing system at component 79. Component 79** may comprise a mixing chamber, gate, cannister, and/or boot of a gypsum product manufacturing system in particular embodiments.

While in the illustrated embodiment water 71 and foaming agent 73 are injected into conduit 66 prior to blending tube 67, it should be understood that in other embodiments foaming constituents (water 71, foaming agent 73 and air 75) may be injected in any suitable location with respect to each other and with respect to one or more blending tubes and mesh strainers positioned within the conduit communicating the foam constituents. Moreover, other embodiments may incorporate a blending tube in other positions with respect to mesh strainers utilized in the conduit.

Systems 40 and 64 provide for the static generation of foam for use in a gypsum product manufacturing system. As discussed above, such static generation is enabled through the use of mesh strainers which reduce the need for agitation provided by a mixing device or otherwise. The number of strainers used in systems such as those illustrated in FIGS. 2 and 3, may be modified within the teachings of the present invention. For example, a single strainer may be used in lieu of the two strainer configurations of FIGS. 2 and 3. Also, the location of the strainer(s) with respect to other components of the system, may be significantly modified in accordance with various embodiments of the present invention.

Figure 4:
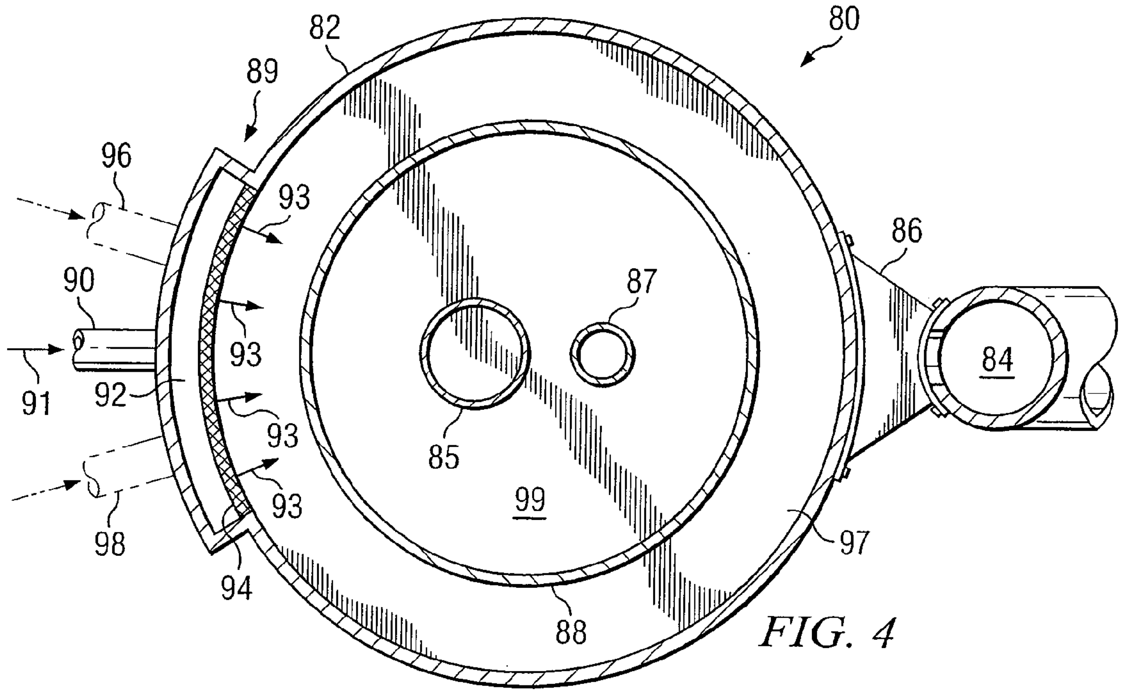
FIG. 4 illustrates injection of foam constituents into a gypsum product manufacturing system, in accordance with an embodiment of the present invention.

FIG. 4 is a top view illustrating components of a gypsum product manufacturing system 80, in accordance with another embodiment of the present invention. System 80 includes a mixing chamber 82 coupled to a cannister 84 by a gate 86. Mixing chamber 82 includes lump ring 88. Mixing chamber 82, cannister 84 and lump ring 88 operate in a similar manner as such components of gypsum product manufacturing system 10 of FIG. 1. Gypsum is introduced into mixing chamber 82 through conduit 85, and water is introduced into mixing chamber 82 through conduit 87.

System 80 includes foam generator 89 to facilitate the generation of foam. Mixing chamber 82 includes an inner mixing region 99 inside lump ring 88, an outer mixing region 97 outside lump ring 88 and a constituent mixing chamber that defines an internal cavity 92 separated from outer mixing region 97 by a mesh strainer 94. Foam generator 89 includes a conduit 90 for introduction of a foam constituent solution into cavity 92 of mixing chamber 82. Mesh strainer 94 may comprise any suitable shape or size to separate cavity 92 from outer mixing region 97 of mixing chamber 82. A foam constituent solution 91 is introduced into cavity 92 through conduit 90. Constituent solution 91 may comprise foam constituents such as water, a foaming agent and air. Such constituent solution enters cavity 92 and passes through mesh strainer 94. Openings in mesh strainer 94 form air bubbles in the constituent solution thus generating foam 93 within mixing chamber 82.

In other embodiments, additional conduits 96 and 98 may be utilized so that foam constituents air, a foaming agent and water may be separately introduced into cavity 92 of mixing chamber 82. For example, air may be introduced via a conduit 96, water may be introduced via conduit 90 and a foaming agent may be introduced via a conduit 98. Such constituents would form a solution in cavity 92, and foam would be generated when the solution passes through mesh strainer 94. In this embodiment, foam is generated at an interface between a chamber that includes the foam constituents, and a chamber that holds a mixed, gypsum slurry. It should be recognized that one or more similar configurations may be used on practically any component (e.g., mixing chamber, gate, cannister, and/or boot) of a gypsum product manufacturing system, to facilitate the generation and mixing of foam, with gypsum slurry.

Figure 5:
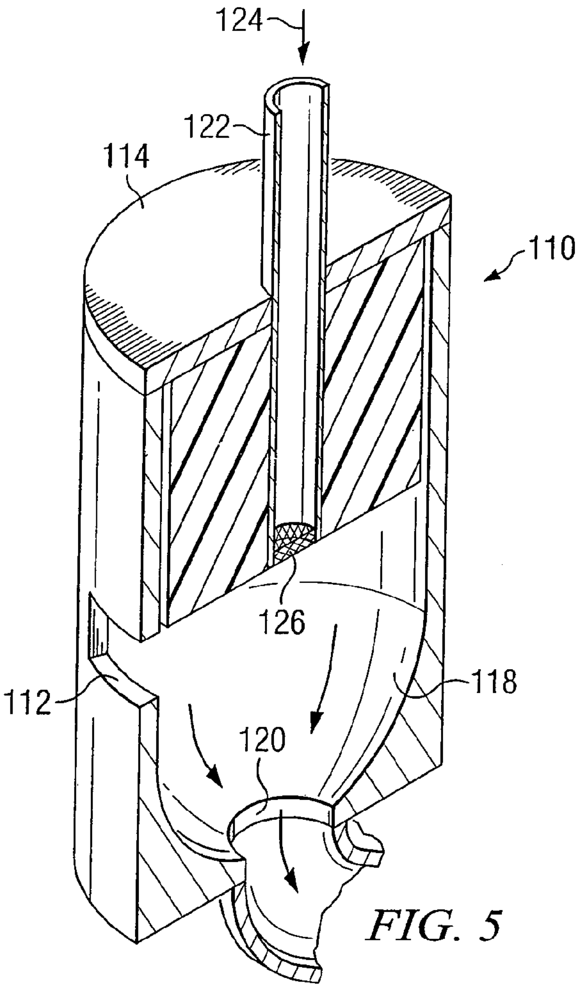
FIG. 5 illustrates the injection of foam constituents into a top of a cannister for use in a gypsum product manufacturing system, in accordance with a particular embodiment of the present invention.

FIG. 5 is a partial illustration of a cannister 110 for use in a gypsum product manufacturing system, in accordance with a particular embodiment of the present invention. Cannister 110 receives a gypsum slurry discharged from a mixing chamber of the manufacturing system and carries the slurry to other components of the system. The gypsum slurry enters cannister 110 through window 112. Internally cannister 110 includes inside surface 118 which tapers towards an opening 120 through which the gypsum slurry passes for communication to other components of the gypsum product manufacturing system. In the illustrated embodiment, foam is generated within cannister 110 via conduit 122 coupled to lid 114. Foam constituents 124 (foaming agent, water, air) flow through conduit 122 and pass through mesh strainer 126 thereby generating foam in the gypsum slurry entering cannister 110 at window 112. Particular embodiments may utilize foam generation system 40 of FIG. 2 or system 64 of FIG. 3, either of which may output foam directly into a top or side of cannister 110.

Figure 6:
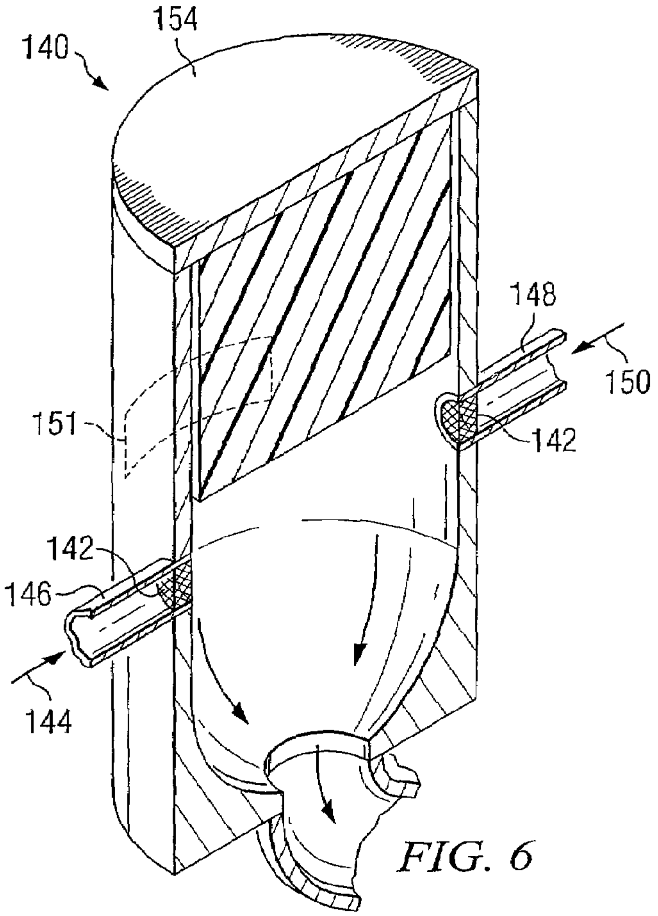
FIG. 6 illustrates injection of foam constituents into a side of a cannister for use in a gypsum product manufacturing system, in accordance with a particular embodiment of the present invention.

FIG. 6 is a partial illustration of a cannister 140 for use in a gypsum product manufacturing system, in accordance with another embodiment of the present invention. Foam constituents are introduced into the side of cannister 140 for mixing with a gypsum slurry discharged from a mixture chamber. Such constituents pass through mesh strainers 142 which facilitates the generation of foam as the constituents combine and enter an internal area of cannister 140. For example, air 144, water and a foaming agent may pass through conduit 146 coupled to cannister 140. Similarly, air, water and foaming agent 150 may pass through conduit 148 coupled to the cannister. The foaming agent, water and air pass through mesh strainers 142 for the generation of the foam to be mixed with the gypsum slurry entering cannister 140 at window 151 below the bottom edge of lid 154 at the window. In particular embodiments, foam constituents may be introduced together into the cannister using a single conduit coupled to the side of the cannister. In such case, a mesh strainer may be positioned within such single conduit for generation of the foam for mixture with the gypsum slurry. Similarly, air, water and foaming agent(s) may each be introduced into several (e.g., more than two) conduits that are in fluid communication with the interior of cannister 140.

Figure 7A:
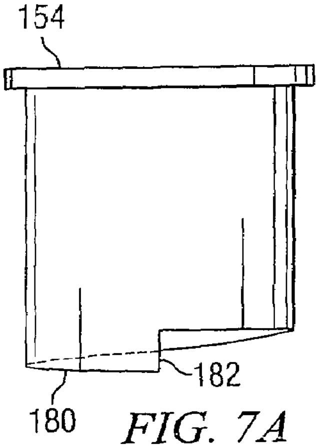
FIGS. 7A and 7B illustrate the lid of the cannister of FIG. 6, in accordance with a particular embodiment of the present invention.
Figure 7B:
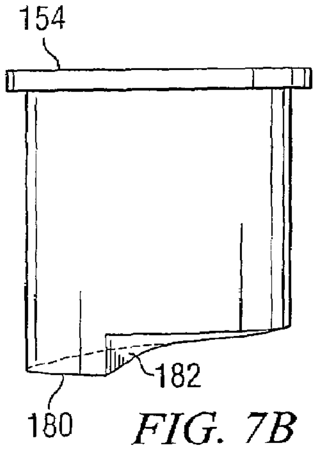

FIGS. 7A and 7B illustrate lid 154 of cannister 140 of FIG. 6 from different angles of view. Lid 154 includes a bottom edge 180 that tapers upward going around the circumference of the lid. A vertical edge 182 of the bottom of lid 154 exists proximate to a side of window 151 of cannister 140 when the lid is positioned upon the cannister. Gypsum slurry enters cannister 140 at window 151 at an angle to initially facilitate circular flow of the gypsum slurry through the cannister. The circumferential taper of bottom edge 180 forces the gypsum slurry downward as it circulates within the cannister and prevents the slurry from circulating back to window 151. It should be understood that other embodiments may include canisters and lids having other shapes or configurations. For example, lid 114 of cannister 110 may have a similar configuration as that of lid 154 except for a vertical passage through the lid for the insertion of foam constituents 124.

Systems illustrated in FIGS. 4-6 provide for the static generation of foam for use in a gypsum product manufacturing system, for example a mixing chamber or a cannister. Such static generation is enabled through the use of mesh strainers which reduce the need for agitation provided by a mixing device or otherwise. Moreover, introduction of foam into a cannister further reduces agitation of the foam and its constituents since the introduction takes place subsequent to agitation of a gypsum slurry by a mixing chamber.

Figure 8:
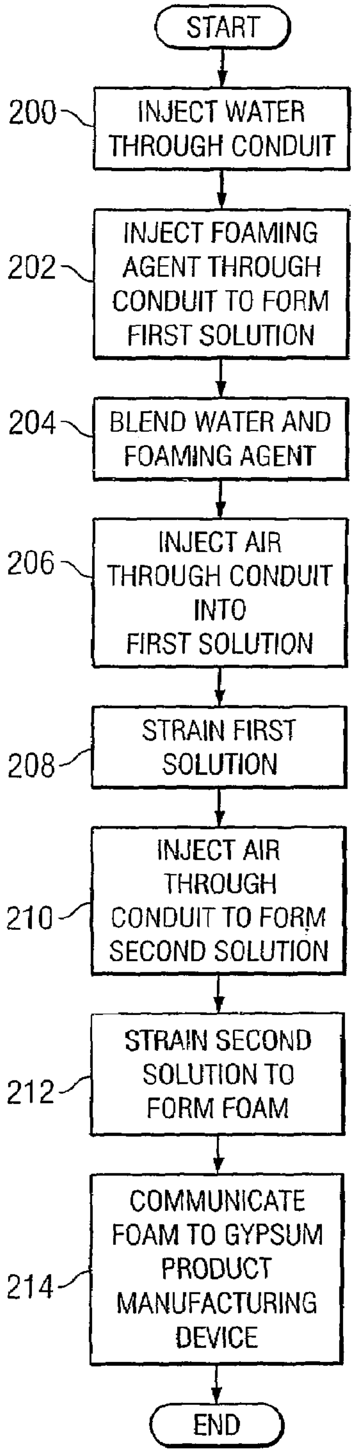
FIG. 8 is a flowchart illustrating a method for generating foam for gypsum products, in accordance with a particular embodiment of the present invention.

FIG. 8 is a flowchart illustrating a method for generating foam for gypsum products, in accordance with a particular embodiment of the present invention. The method begins at step 200 where water is injected through a conduit. The conduit may comprise a pipe having a diameter of approximately 1.5 inches. At step 202, a foaming agent is injected through the conduit to form a first solution comprising the water and the foaming agent. The foaming agent may be injected through the conduit using a pipe coupled to the conduit. The pipe may have a diameter of approximately 0.5 inch.

At step 204, the water and the foaming agent are blended in a blending tube in the conduit. At step 206, air is injected through the conduit into the first solution. The air may be injected through the conduit using a pipe having a diameter of approximately 0.75 inch coupled to the conduit. At step 208, the first solution is strained. In particular embodiments, the first solution may be strained using a 1.5 inch in-line number 60 mesh strainer. At step 210, air is injected through the conduit downstream of the straining of the first solution to form a second solution comprising the water, foaming agent and air.

At step 212, the second solution is strained to form foam. The straining of the second solution may be accomplished using a 1.5 inch number 72 mesh basket strainer. At step 214, the foam is communicated to a gypsum product manufacturing device. Such device may comprise a mixing chamber or a cannister in particular embodiments.

Some of the steps illustrated in FIG. 8 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a gypsum product manufacturing system, these elements may be combined, rearranged or positioned in order to accommodate particular manufacturing or operational needs. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A system for generating foam for gypsum product manufacturing, comprising:

a conduit operable to receive water and a foaming agent injected through the conduit, the water and foaming agent forming a first solution in the conduit;

a first strainer positioned in the conduit and operable to strain the first solution in the conduit;

the conduit operable to receive air injected through the conduit downstream of the first strainer, the air forming a second solution comprising the air, water and foaming agent;

a second strainer positioned in the conduit and operable to strain the second solution to form foam; and wherein the conduit communicates the foam to a gypsum product manufacturing device.

2. The system of claim 1, further comprising:

a blending tube operable to blend the water and the foaming agent in the conduit; and wherein the conduit is further operable to receive air injected through the conduit into the first solution upstream of the first strainer.

3. The system of claim 1, wherein the conduit comprises a pipe having a diameter of approximately 1.5 inches.

4. The system of claim 1, further comprising a pipe having a diameter of approximately 0.5 inch for communicating the foaming agent to the conduit.

5. The system of claim 1, further comprising a pipe having a diameter of approximately 0.75 inch for communicating the air to the conduit.

6. The system of claim 1, wherein the gypsum product manufacturing device comprises a mixing chamber.

7. The system of claim 1, wherein the gypsum product manufacturing device comprises a cannister conveying a gypsum mixture from a mixing chamber.

8. The system of claim 1, wherein the first strainer comprises a 1.5 inch in-line number 60 mesh strainer.

9. The system of claim 1, wherein the second strainer comprises a 1.5 inch number 72 mesh basket strainer.

10. A system for generating foam for gypsum product manufacturing, comprising:

at least one conduit operable to communicate foam constituents injected through the at least one conduit to a gypsum product manufacturing device, the foam constituents comprising water, air and a foaming agent;

a mesh strainer associated with the gypsum product manufacturing device such that foam is generated when the foam constituents pass through openings of the mesh strainer into the gypsum product manufacturing device; and wherein the foam combines with gypsum for manufacturing gypsum products in the gypsum product manufacturing device.

11. The system of claim 10:

wherein the at least one conduit operable to communicate foam constituents to a gypsum product manufacturing device comprises:

a first conduit coupled to the gypsum product manufacturing device, the first conduit operable to communicate water into a cavity of the gypsum product manufacturing device;

a second conduit coupled to the gypsum product manufacturing device, the second conduit operable to communicate air into the cavity; and a third conduit coupled to the gypsum product manufacturing device, the third conduit operable to communicate a foaming agent into the cavity; and wherein the cavity is separated from an outer mixing region of a mixing chamber by the mesh strainer such that the foam is generated as the water, air and foaming agent pass through the openings of the mesh strainer into the outer mixing region.

12. The system of claim 10, wherein the gypsum board manufacturing device comprises a cannister conveying a gypsum mixture from a mixing chamber.

13. The system of claim 12, wherein at least one conduit operable to communicate foam constituents injected through the at least one conduit to a gypsum product manufacturing device comprises at least one conduit operable to communicate foam constituents injected through the at least one conduit into a top of the cannister.

14. The system of claim 12, wherein at least one conduit operable to communicate foam constituents injected through the at least one conduit to a gypsum product manufacturing device comprises at least one conduit operable to communicate foam constituents injected through the at least one conduit into a side of the cannister.

15. The system of claim 12, wherein the at least one conduit operable to communicate foam constituents to a gypsum product manufacturing device comprises:

a first conduit coupled to the gypsum product manufacturing device, the first conduit operable to communicate water into a cavity in the side of the cannister;

a second conduit coupled to the gypsum product manufacturing device, the second conduit operable to communicate air into the cavity; and a third conduit coupled to the gypsum product manufacturing device, the third conduit operable to communicate a foaming agent into the cavity; and wherein the cavity is separated from an internal chamber of the cannister by the mesh strainer such that the foam is generated as the water, air and foaming agent pass through the openings of the mesh strainer into the internal chamber.

* * * * *